United States Patent
Batushanskiy

(10) Patent No.: US 10,662,599 B2
(45) Date of Patent: May 26, 2020

(54) AUTOMATED DEPLOYMENT OF PRESSURE-DRYING APPARATUS FOR IMPROVED TRACTION

(71) Applicant: Paul Batushanskiy, Brooklyn, NY (US)

(72) Inventor: Paul Batushanskiy, Brooklyn, NY (US)

( * ) Notice: Subject to any disclaimer, the term of this patent is extended or adjusted under 35 U.S.C. 154(b) by 0 days.

(21) Appl. No.: 15/386,251

(22) Filed: Dec. 21, 2016

(65) Prior Publication Data

US 2020/0087877 A1 Mar. 19, 2020

(51) Int. Cl.
*E01H 10/00* (2006.01)
*B05B 1/20* (2006.01)
*B64C 25/00* (2006.01)

(52) U.S. Cl.
CPC ............ *E01H 10/005* (2013.01); *B05B 1/20* (2013.01); *B64C 25/001* (2013.01)

(58) Field of Classification Search
CPC ........ E01H 10/005; B05B 1/20; B64C 25/001
USPC .......................................................... 701/36
See application file for complete search history.

(56) References Cited

U.S. PATENT DOCUMENTS

| | | | | |
|---|---|---|---|---|
| 3,842,680 | A * | 10/1974 | Vollick | B01L 3/021 73/864.22 |
| 4,484,708 | A * | 11/1984 | Hait | A01G 25/092 239/728 |
| 7,914,020 | B2 * | 3/2011 | Boston | B60G 3/20 280/124.136 |

* cited by examiner

*Primary Examiner* — Tan Q Nguyen
(74) *Attorney, Agent, or Firm* — Patent Ventures, LLC

(57) ABSTRACT

In general, one aspect of the invention relates to an apparatus comprising: a vertical support member pivotally mounted to any one of a wheel axle, chassis, or landing gear at a first terminal end and coupled perpendicularly to a horizontal member to an opposing terminal end; said horizontal member dimensioned with a first plurality of linear dispensing nozzles oriented towards a bottom portion of at least one wheel, and a second plurality of linear dispensing nozzles oriented towards a top portion of a driving surface, wherein the first and second plurality of linear dispensing nozzles are each fed by an air or fluid line that diverges from a single air or fluid line in operable communication with an on-board air-pressure unit; said vertical support member and horizontal member configured to extend into a down-right position electro-mechanically at the first terminal end, wherein the first plurality and second plurality of linear dispensing nozzles is positioned less than 24 inches from the bottom portion of at least one wheel and the top portion of the driving surface, wherein activation of the vertical support member and horizontal member extending into the down-right position and deployment of pressurized air or fluid from the first and second plurality of linear dispensing nozzles.

21 Claims, 8 Drawing Sheets

AUTOMATED DEPLOYMENT OF PRESSURE-DRYING APPARATUS FOR IMPROVED TRACTION

BACKGROUND

Passengers traveling in various vehicles including airplanes, trains, bus, and automobiles often suffer from the loss of traction during wet surface contact. Such loss of traction can potentially lead to tragic accidents. Runway safety has now included the use of a foam bed at the end of runways to create resistance of the wheel-surface contact area, with the hopes of slowing down an airplane that has lost traction due to a wet surface. However, the loss of traction on the runway, prior to reaching the terminal foam bed, may lead to a significant accident prior to hitting the foam bed, such as driving off the side of a runway or toppling over.

Additionally, the advent of anti-lock braking has helped in aircrafts and vehicles from preventing a sliding action and loss of control during braking on wet surfaces. Essentially, the brakes pump intermittently to prevent locking of the brakes, which significantly improves traction. However, such anti-lock braking still results in a loss of control and traction, depending on the conditions of the road surface, speed of the vehicle, and braking conditions.

FIELD OF THE INVENTION

The present invention generally relates to the field of traction control. More particularly, this disclosure describes an apparatus that provides an automated deployment of pressure-drying apparatus coupled to a landing gear or wheel axis for improved traction.

RELATED ART

Numerous devices including anti-lock braking system and vertical stabilizing system have been long incorporated on vehicles and aircrafts to improve traction control and stability. Essentially, they both automate the principles of threshold braking and cadence braking, to prevent wheel locking and vehicle skidding by intermittently pumping the brakes at an extremely fast rate—a rate much faster than can be achieved by a human.

When the system of wheel sensors and a controller detects a wheel rotating significantly slower than the others—lower than a certain threshold value—the system actuates the valves to reduce hydraulic pressure and brake force to the brake at the slower wheel. Conversely, if the system of sensors and a controller detects a wheel turning significantly faster than the others, brake hydraulic pressure to the wheel is increased, increasing brake force at the faster wheel. Again, such adaptive brake force application may significantly reduce wheel locking and subsequent skidding, however, skidding may continue to persist depending on the driving surface conditions.

Thus, there is a market void for a traction-improving device coupled to a vehicle, which is involved in complementing a vehicles ABS system, by improving the concurrent, drive-time driving surface conditions.

There are currently no patent references that disclose such a traction-improving device, intended to complement the primary traction delivery of ABS and tire material/threading. A patent granted to Rydzewski (U.S. Pat. No. 6,497,053) discloses an air discharge unit coupled to a conduit and terminating with a discharge opening, however, it is designed to improve traction on a locomotive railway, and not a traditional driving surface. As a result of this, the discharge opening may be limited to a single, concentrated discharge opening, and still succeed in improving traction on a linear application, such as a locomotive railway. However, such a single, concentrated discharge opening would be limited in disbursing a drying agent or air across a wheel path of a driving surface. Moreover, the single, concentrated discharge of Rydzewski is not adaptive or dynamic based on an input data fed from any one an input source. The discharge isn't discriminate and doesn't respond dynamically in accordance with a stimulus or an input data. The discharge disclosed in Rydzewski is simply reactive, and based on a user input of a locomotive engineer.

SUMMARY

The embodiments of the present invention relate to a vertical support member and cross-member disposed with a plurality of linear dispensing nozzles, and more specifically, the embodiments of the present invention relate to dynamic and adaptive discharge of drying agents from said dispensing nozzles onto a surface of a wheel and wheel path based on any one of input data for improved traction.

In general, one aspect of the invention relates to an apparatus comprising: a vertical support member pivotally mounted to any one of a wheel axle, chassis, or landing gear at a first terminal end and coupled perpendicularly to a horizontal member to an opposing terminal end; said horizontal member dimensioned with a first plurality of linear dispensing nozzles oriented towards a bottom portion of at least one wheel, and a second plurality of linear dispensing nozzles oriented towards a top portion of a driving surface, wherein the first and second plurality of linear dispensing nozzles are each fed by an air or fluid line that diverges from a single air or fluid line in operable communication with an on-board air-pressure unit; said vertical support member and horizontal member configured to extend into a down-right position electro-mechanically at the first terminal end, wherein the first plurality and second plurality of linear dispensing nozzles is positioned less than 24 inches from the bottom portion of at least one wheel and the top portion of the driving surface, wherein activation of the vertical support member and horizontal member extending into the down-right position and deployment of pressurized air or fluid from the first and second plurality of linear dispensing nozzles.

The apparatus is further comprising of a processor; a memory element coupled to the processor; and encoded instructions; wherein the device is further configured to: receive input data; based on the received input data, control an actuator at the first terminal end of the vertical support member to extend the member into a down-right position; based on the received input data, activate the air pressure unit to control air and, or liquid flow through the single and, or diverged air or fluid lines; and based on the received input data, deliver a drying agent to the bottom portion of the wheel and the top portion of the driving surface from the first plurality of linear dispensing nozzles and the second plurality of linear dispensing nozzles.

According to another exemplary embodiment, a system is disclosed describing the apparatus networked with an array of sensors, controller, vehicle's ABS system, etc. and configured to deliver a wheel-path disbursal of drying agents from a plurality of linear dispensing nozzles based on a received input data. The input data may be from any one the networked sensors, controller, vehicle's ABS system, and, or contextual data sources, such as off-board or off-networked data sources. For example, a weather report of a 60% likelihood of precipitation from a meteorological agency may inform the system to deploy the apparatus during the engagement of the landing gear.

As another object of the invention, a method of delivering high-pressurized air, possibly along with other drying agents, abrasives, or desiccants, through a plurality of linear dispensing nozzles, which are adaptively responsive based on input data, is provided.

Other devices, apparatus, and/or products according to embodiments will be or will become apparent to one of ordinary skill in the art upon review of the following drawings and further description. It is intended that all such additional devices, apparatus, and/or products be included within this description, be within the scope of the present invention, and be protected by the accompanying claims.

DETAILED DESCRIPTION

Figure 1A:
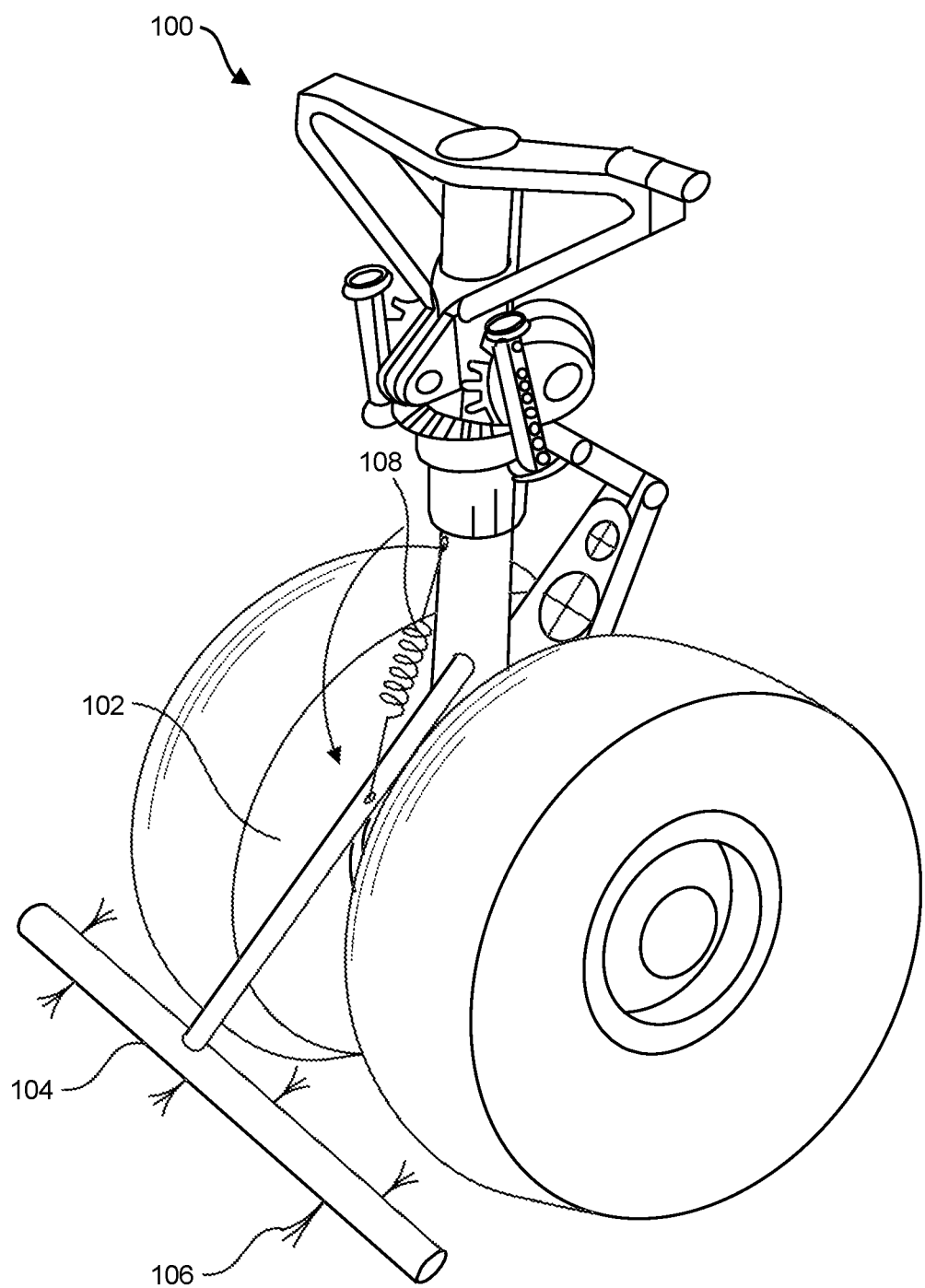
FIG. 1a shows a front perspective view diagram according to aspects of the invention.

The following is a discussion and description of preferred specific embodiments of the automated deployment of pressurized air apparatus for improved traction as claimed, such being made with reference to drawings, and in particular to FIGS. 1 to 6 thereof, whereupon the same reference numerals are used to indicate the same or similar parts and/or structure. Such discussion and description is to illustrate and not to unduly limit the scope of the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

Figure 1B:
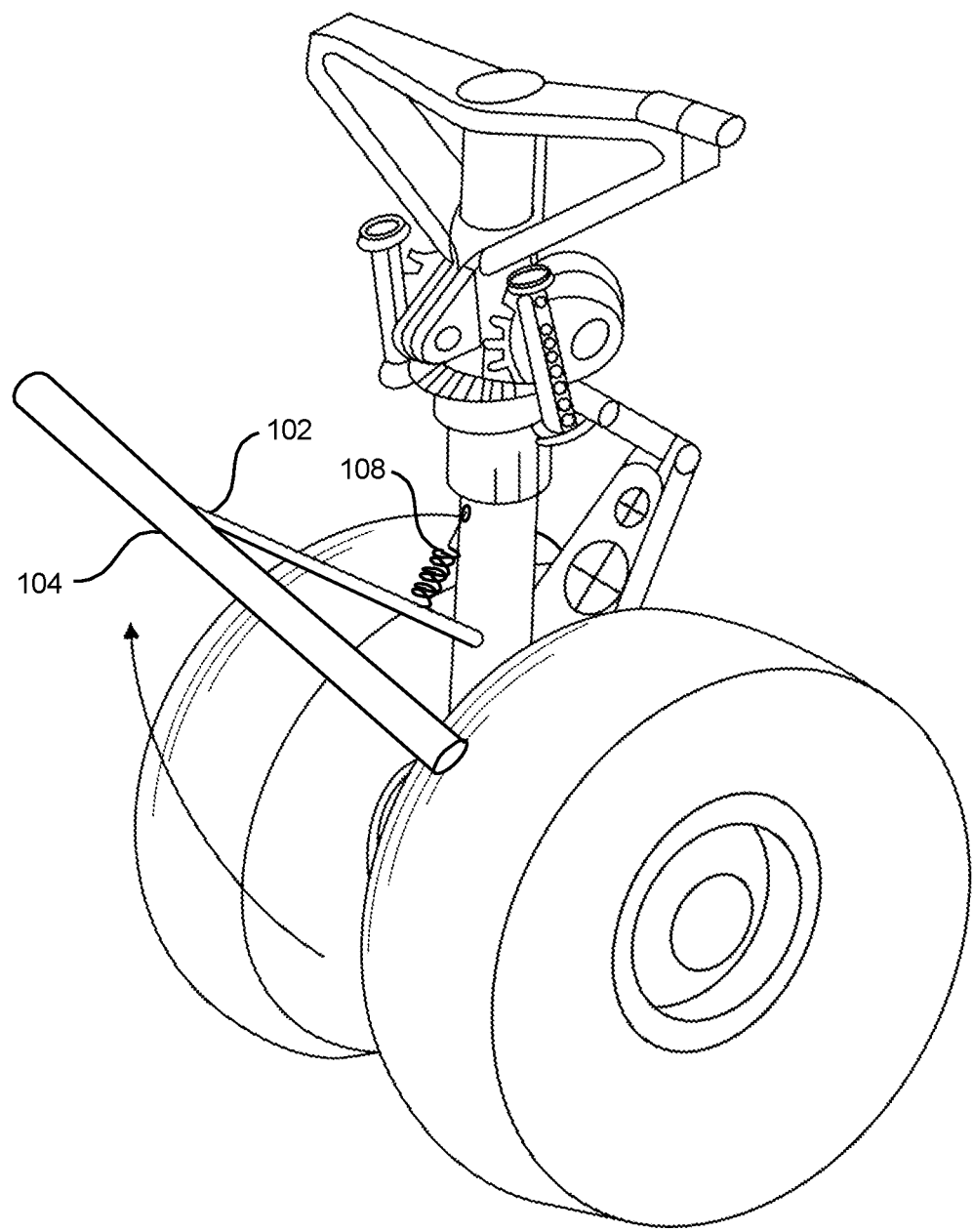
FIG. 1b shows a front perspective view diagram according to aspects of the invention.
Figure 1C:
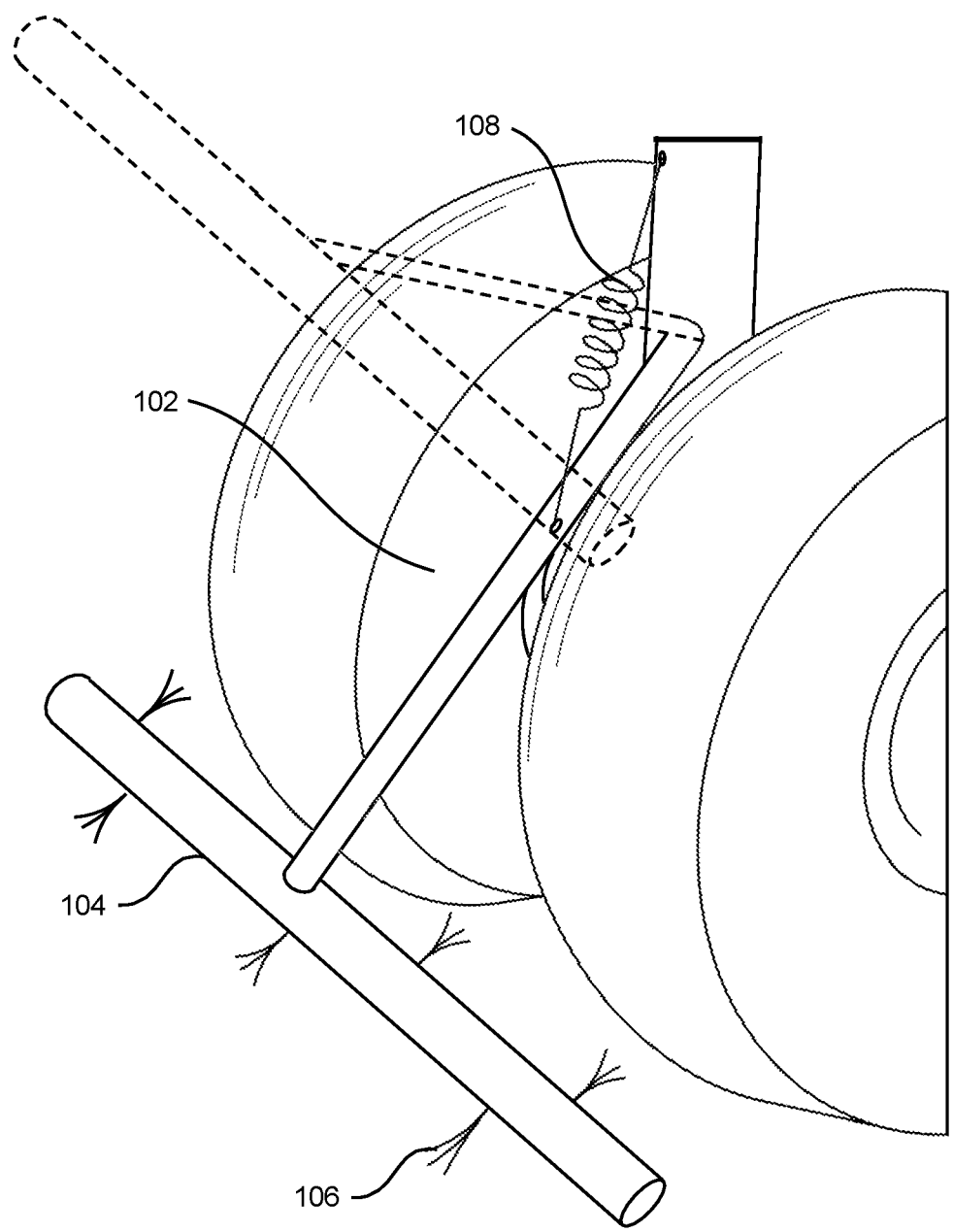
FIG. 1c shows a front perspective view diagram according to aspects of the invention.

Referring to the drawings in detail and particularly to FIGS. 1a, 1b, and 1c, the automated deployment of pressurized air apparatus for improved traction is shown in a series of three perspective views. FIGS. 1a, 1b, and 1c show one of many embodiments that have been conceived by the inventor. In its normal usage, the user may manipulate the configuration of the apparatus from an up-right, inactive state to a down-right active state by actuating a spring-coil tension release or actuating an electro-mechanical means disposed within a housing at a top end of the vertical support bar. However, the preferable trigger for deployment will be a signal input from a braking system, such as anti-lock braking, to initiate deployment of the member from an up-right inactive state to an active down-right state—in real-time. In yet other alternative embodiments, triggers may be a signal input from a sensing means or an array of sensors to detect the presence of slippery road conditions or wheel slippage.

Once deployed, the high-pressure air flow from the air-pressure unit, through the supply line, and finally, the dispensing nozzles for output may stabilize the apparatus during landing impact of an aircraft, wheel slippage of a vehicle, etc. In other embodiments, the actuator or coupling joints, housed or non-housed, support stability and the degree of inclination during deployment. In other embodiments, the apparatus, while not shown in FIGS. 1a, 1b, nor 1c, may comprise of a unitary construction, seamlessly coupling the vertical support member with horizontal member disposed with the plurality of linear dispensing nozzles. In such an embodiment, the unitary construction with considerable load bearing and tensile strength also provides for greater stability during the active state—with only a single point of actuation/articulation at the vehicle/craft coupling point. High-pressure output through a series of channel flows, resulting in disbursal from angled nozzles, or articulating nozzles, may be preferred. Alternatively, the angled nozzles, or articulating nozzles, may disburse any one of, or combination of, air, desiccant, and, or abrasive.

Figure 3:
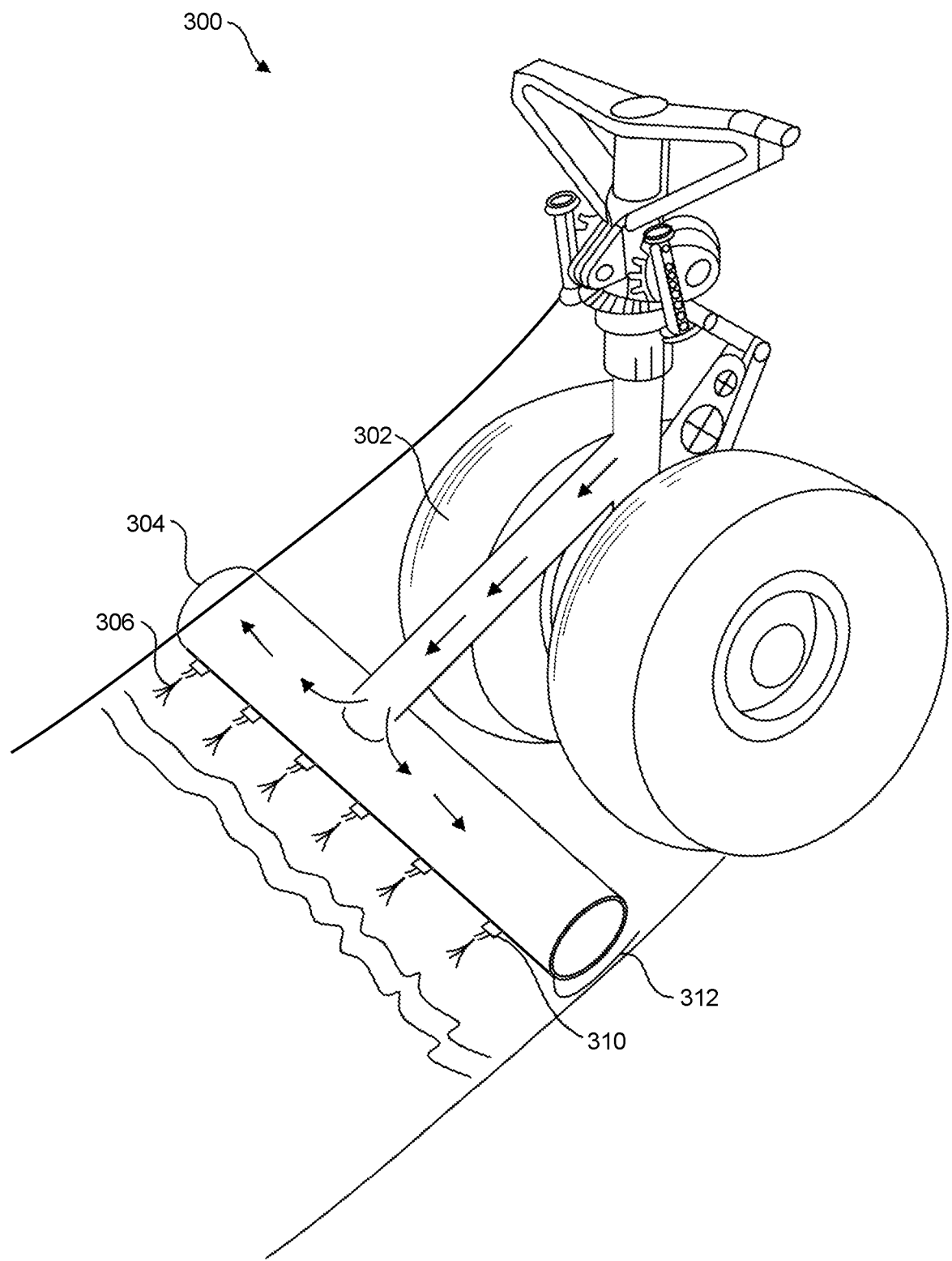
FIG. 3 shows an enlarged top perspective view diagram according to aspects of the invention.

Now referring to FIGS. 1a, 1b, and 1c, the automated deployment of pressurized air for improved traction 100 is illustrated in a front perspective view and depicts a vertical support member 102, coupled to a vehicle or aircraft at one end, and a horizontal member 104 emitting a plurality of linear air burst or high-pressure air output 106, While not shown in FIGS. 1a, 1b, and 1c, the air burst 106 is emitted from a plurality of linear dispensing nozzles (shown in greater detail in FIG. 3). In a preferred embodiment, the terminal end of the vertical support member 102 (distal from the horizontal member 104) may be in tensionable communication via a spring coil 108 with a portion of any one of a landing gear, vehicle wheel, and, or chassis. In the case of FIGS. 1a, 1b, and 1c, the spring coil is coupled to a landing gear. Alternatively, deployment may be achieved by an actuator housed at the point coupling any one of the vertical support member 102 with aircraft/vehicle, and, or vertical support member 102 with horizontal member 104. While preferred embodiments may have members comprising of light-weight, high-tensile aluminum or injection-moldable thermoplastic or polymer tubular walls, generally forming an inverted T-shaped structure, other shaped walls may be embodied such as squared, elliptical, etc., without departing from the scope of the invention. Other embodiments may include a half-circular or half-elliptical shaped members—with any one of an I-shaped, inverted T-shaped, inverted U-shaped or rotated C-shaped mount.

In an exemplary embodiment, as shown in FIGS. 1a, 1b, and 1c, the apparatus 100 is comprised of a a vertical support member 102 pivotally mounted to any one of a wheel axle, chassis, or landing gear at a first terminal end and coupled perpendicularly to a horizontal member 104 to an opposing terminal end; said horizontal member 104 dimensioned with a first plurality of linear dispensing nozzles oriented towards a bottom portion of at least one wheel, and a second plurality of linear dispensing nozzles oriented towards a top portion of a driving surface, wherein the first and second plurality of linear dispensing nozzles are each fed by an air or fluid line that diverges from a single air or fluid line in operable communication with an on-board air-pressure unit.

Preferably, the vertical support member 102 and horizontal member 104 are configured to extend into a down-right position electro-mechanically at the first terminal end, wherein the first plurality and second plurality of linear dispensing nozzles is positioned less than 24 inches from the bottom portion of at least one wheel and the top portion of the driving surface, wherein activation of the vertical support member 102 and horizontal member 104 extending into the down-right position and deployment of pressurized air 106 or fluid from the first and second plurality of linear dispensing nozzles;

Furthermore, the apparatus or device may further comprise a processor; a memory element coupled to the processor; and encoded instructions, wherein the apparatus or device is further configured to: receive input data; based on the received input data, control an actuator at the first terminal end of the vertical support member 102 to extend the member into a down-right position; based on the received input data, activate the air pressure unit to control air and, or liquid flow through the single and, or diverged air or fluid lines; and based on the received input data, deliver an air burst 106 or drying agent to the bottom portion of the wheel and the top portion of the driving surface from the first plurality of linear dispensing nozzles and the second plurality of linear dispensing nozzles.

In continuing reference to FIGS. 1a, 1b, and 1c, the support members 102, 104 may comprise of a rigid, inelastic aluminum, or any composite with similar performance characteristics, such as magnesium, titanium, etc. In alternative embodiments, members 102, 104 may comprise of a flexible, bendable, pliable or malleable material, such as, for example, a soft temper metal, like steel alloy, aluminum alloy, steel that is of a stiffness that requires only moderate force to bend the crux into a particular shape, yet preserves that shape once assumed. Further yet, in an alternative embodiment, a stiff, inelastic or elastic, pliable thermoplastic-polymer may be used to compose the members 102, 104.

The vertical support member 102 may be in tensionable communication with any portion of a landing gear, wheel axle, or vehicle chassis, by a spring-coil attachment 108, enabling any one of, or combination of, a lowering of the vertical support member 102 into an active state, or raising of the vertical support member 102 into a resting state. Alternatively, actuation or articulation at the vertical support member 102-gear/wheel interface (primary interface) may be achieved by any one of an electro-mechanical means housed within a housing located within this interface coupling. The vertical support member 102-horizontal member 104 interface (secondary interface) may additionally be non-articulated or articulated, based on the scale of the air burst path. Articulation of this secondary interface may be achieved similarly as the primary interface. The secondary interface may be non-articulated and simply coupled at the interface point. In other embodiments, the terminal end of the vertical support member 102 may be conjoined with the horizontal member at the secondary interface point as a single, contiguous, unitary piece.

Coupling of the spring-coil at the primary interface point may be achieved by any one of clamp mount, traversal pin, pin and loop, hook, etc. Coupling may also be achieved by a clamp mount disposed on the underside of the unit housing the electro-mechanical actuation/articulation means.

In some embodiments, telescopic features may be added to any one of the members 102, 104 to adjust the height of the vertical support member 102 or width of the horizontal support member 104. By adjusting the height of the vertical support member, one can attain a closer air burst 106, and by adjusting the width of the horizontal member 104, one can widen the air burst 106 path. In other embodiments, lock mechanism may be fitted to these telescopic joints to lock a preferred height or width. Lock mechanisms may also be fitted onto the coupling points at any one of the interface points (primary or secondary).

Figure 2:
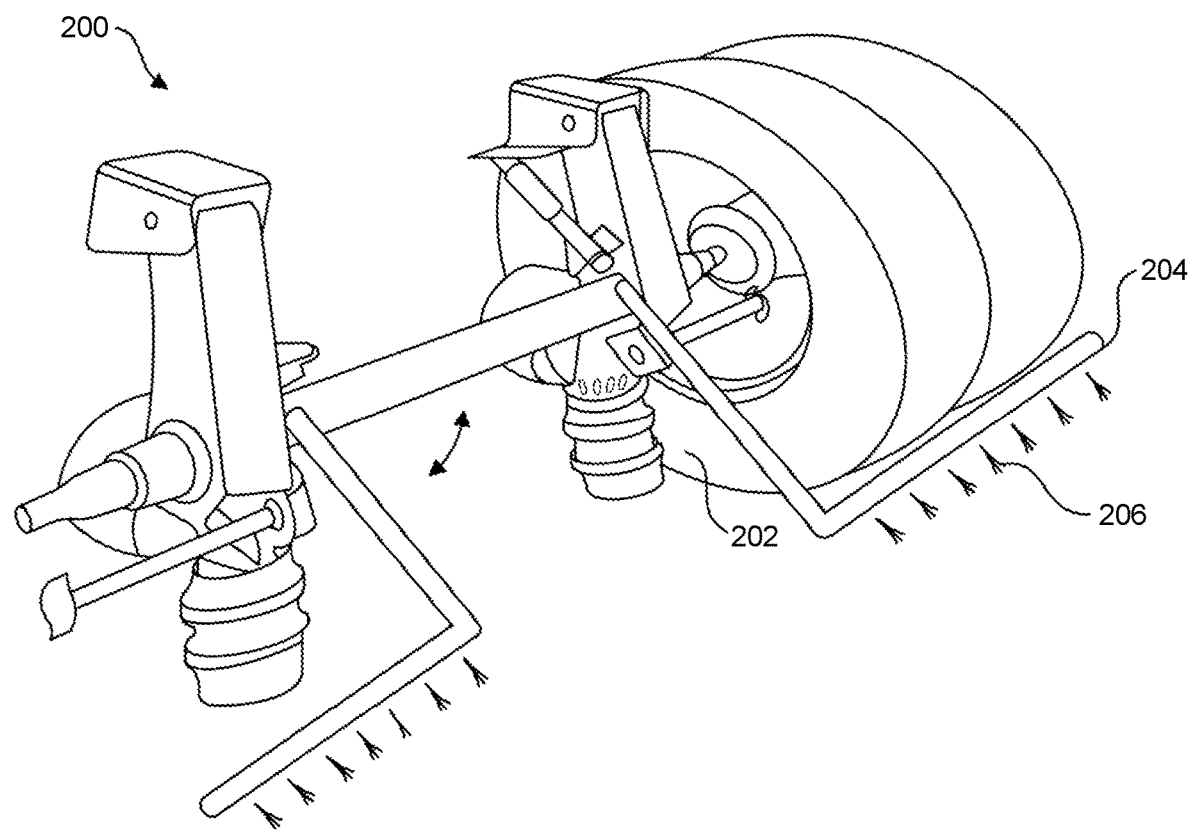
FIG. 2 shows a front-perspective view diagram according to aspects of the invention.

Now in reference to FIG. 2. FIG. 2 shows a front perspective view of the same apparatus or device 200 coupled to a tractor-trailer or vehicle wheel axle. FIG. 2 depicts a vertical support member 202, coupled to a vehicle wheel axle or chassis at one end, and a horizontal member 204 emitting a plurality of linear air burst or high-pressure air output 206. While not shown in FIG. 2, the air burst 206 is emitted from a plurality of linear dispensing nozzles (shown in greater detail in FIG. 3). In a preferred embodiment, the terminal end of the vertical support member 202 (distal from the horizontal member 204) may be in tensionable communication via a spring coil 208 with a portion of any one of a vehicle wheel, and, or chassis.

Alternatively, the terminal end of the vertical support member 202 may be disposed with a housing containing an electro-mechanical actuator for causing deployment. The same actuation may also cause circular and, or axial rotation of the vertical support member 202. In some embodiments, the opposing terminal end of the vertical support member 202 may interface with the horizontal member 204 with a housing also containing an electro-mechanical actuation for causing axial and, or circular rotation of the horizontal member 204.

FIG. 3 is a top perspective view of the same apparatus or device 300. FIG. 3 depicts a horizontal member 304 emitting a plurality of linear air burst or high-pressure air output 306 from a series of dispensing nozzles 310. In a preferred embodiment, these dispensing nozzles 310 may be tilted away from the wheel path or towards the undercarriage of the vehicle or craft. This tilting of the dispensing nozzles 310 results in high-pressure output and subsequent water-splash deflected away from the wheel path or the path of other vehicles or crafts. Moreover, in the case of aircrafts, it has the added benefit of deflecting water splash from the jet engine intake. In other embodiments, the nozzles may be adjustable and dynamically tilted based on weather, surface, and, or driving conditions. The articulation of the nozzles may be based on a variety of signal inputs, including a driver manual input.

Still in reference to FIG. 3, at the terminal end of the horizontal member 304, a ground clearance 312 or a set of wheels may be disposed on the underside of the horizontal member 304. The ground clearance 312 may serve to prevent the device 300 from striking the driving surface during deployment. The ground clearance material may be comprised of high-strength thermoplastic polymer, aluminum, aluminum alloy, etc., and simply needs to be a foot or so in length, with a nominal diameter.

Figure 4:
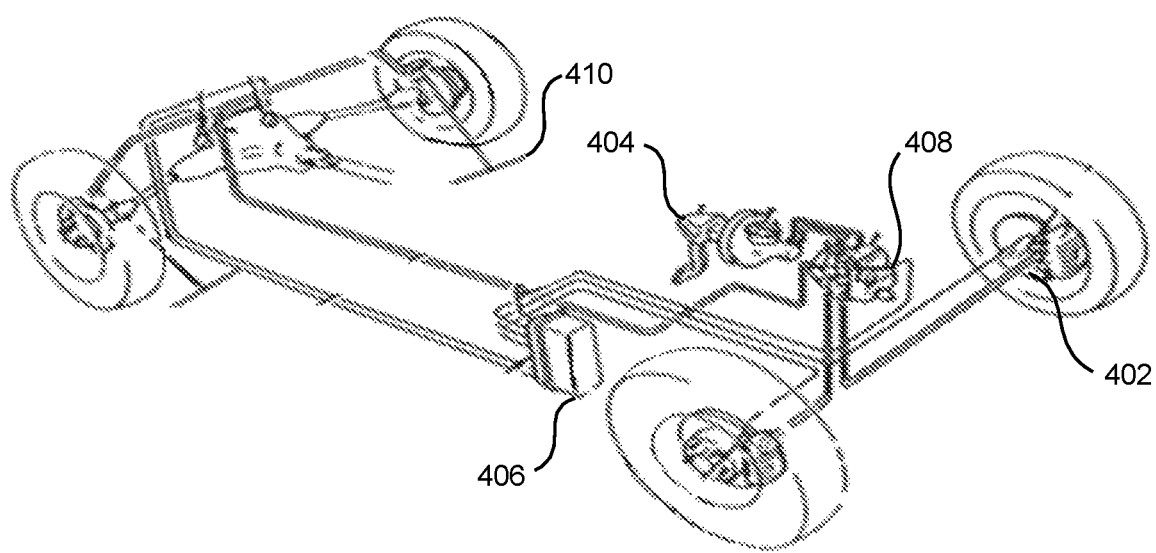
FIG. 4 shows a system block diagram according to aspects of the invention.

FIG. 4 illustrates a schematic of the anti-lock braking system integrated with the device in accordance with an aspect of the invention. There are a variety of triggers or cues for initiating deployment of the device and causes high-pressure air burst from the dispensing nozzles. In one embodiment, the input data triggering deployment and air burst is the activation of a vehicle or aircraft anti-lock braking system and, or vertical stabilizing system.

The device 410 may be operationally integrated or coupled with a vehicle's or aircraft's anti-lock braking and, or electronic stability control system. FIG. 4 depicts a vehicle's anti-locking and stability control system coupled to the traction improvement device 410. The vehicle may have an anti-locking (ABS) and stability control system (ECS) comprising of wheel speed sensors 402, steering wheel and gyroscopic sensors 404, an electronic control unit (ECU) 406, and a hydraulic modulator 408. Upon detection of a wheel rotating slower than a critical threshold by the wheel speed sensors 402, the ECU 406 will then send an input signal to the hydraulic modulator 408 to selectively apply lower hydraulic pressure to the affected wheel during braking. The device 410 may be operationally integrated with the ABS/ESC by integrating into the above mentioned control circuit. During monitoring of the slower wheel during braking by the ECU 406, the same input signal that is directed to the hydraulic modulator 408, may activate deployment of the device 410; deployment of the horizontal member into an active state and bursting of high-pressure air from the dispensing nozzles.

Upon detection of a discrepancy of leveling data between the steering wheel sensor data and gyroscopic sensor data 404, the ECU 406 will relay an input signal to the hydraulic modulator 408 for applying selective brake pressure to an affected wheel. In a preferred embodiment, the same input signal will also trigger deployment of the horizontal member of the device 410 for high-pressure air burst to cause improved traction.

In other embodiments, other triggering data may activate deployment, such as contextual or outboard data: airport tower data, weather station data, fleet center data, etc. Signals generated from any one of these outboard or external sources may over a network communicate with an on-board access point coupled to the ECU 406, which may then signal deployment of the horizontal member and nozzle disbursal of the high-pressure air. Alternatively, driver or pilot manual deployment of the device 410 may be achieved by an electro-mechanical actuation of the tensionable spring coil or deployment means housed at a landing gear/wheel axle-vertical support member interface. The tensionable spring coil or deployment means/housing may further comprise pivotal means which is manually controlled or automated based on any one of input signal. The pivot may allow the dispensing nozzles and air burst path a wider range of motion.

Figure 5:
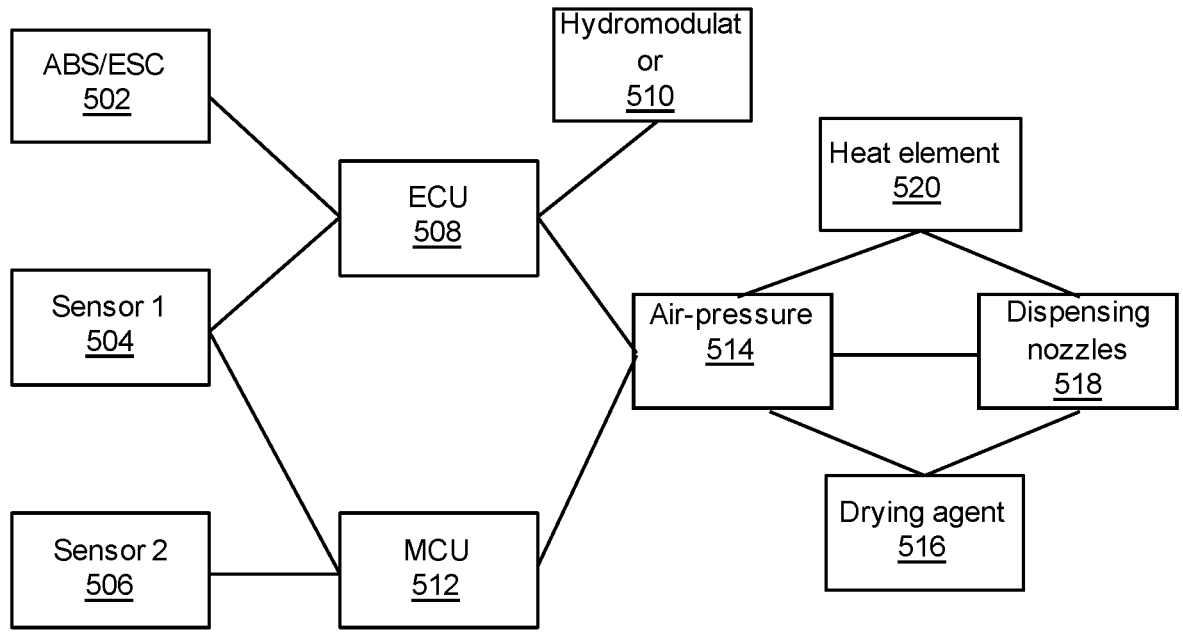
FIG. 5 shows a system block diagram according to aspects of the invention.

Now in reference to FIG. 5. FIG. 5 illustrates a system block diagram, depicting the array of sensors and their interrelation with the electronic control unit of the vehicle or micro-controller of the device to effectuate deployment. FIG. 5 depicts the array of sensors associated with a vehicle's or craft's ABS/ECS system 502 in communication with the vehicle's or craft's ECU 508. The ECU 508 may then be in operable communication with the vehicle's or craft's hydromodulator 510 for applying selective brake pressure to an affected wheel during slippage, and in simultaneous communication with the air-pressure unit 514. The air pressure unit 514 may then apply high-pressure air through a drying agent unit 516; through at least one supply line; and finally disbursed through a plurality of dispensing nozzles 518 for causing drying air burst. In other embodiments, the air pressure unit 514 may by-pass the drying agent unit 516, and directly pass the high-pressure air to the plurality of dispensing nozzles 518 through at least one supply line. The drying agent unit 516 may comprise any one of an abrasive and, or any one of a desiccant—to be in communication with the high-pressure air flowing from the air pressure unit 514—for disbursal from either the plurality of dispensing nozzles 518 or a dedicated dispensing nozzle/s.

Still referring to FIG. 5, in one embodiment, the input data may be fed from a first type of sensor 504, which is on-board the vehicle or craft, and independent of the device. This sensor 1 504 may also be independent of the ABS/ESC array of sensors 502, such as wheel speed sensors, steering sensors, and gyroscopic sensors. Sensor 1 504 may be configured for detecting the wet or icy conditions of the road surface, or more particularly, to the wheel path surface. The signals from sensor 1 504 may be communicated to the ECU 508 of the vehicle or craft and, or to the micro-controller (MCU) 512 integrated into the device. The signals from the ECU 508 and, or MCU 512 may then be in communication with the air pressure unit 514 of the device. Once activated, the high-pressure air is directed to flow directly for disbursal from the plurality of dispensing nozzles 518, or to be directed to the drying agent unit 516 first, and then through at least one supply line and finally leading to disbursal through the plurality of dispensing nozzles 518.

In continuing reference to FIG. 5, a second type of sensor, sensor 2 506, independent of the ABS/ESC sensors 502 and on-board sensor 1 504, may be disposed on the device. The on-device sensor 2 may be configured to detect wet or icy conditions of the road surface, or more particularly, to the wheel path surface. The signals from sensor 2 506 may communicate directly with the on-device MCU 512, and is not in communication with the vehicle's or craft's ECU 508. The translated signal from the on-device MCU 512 then communicates activation of the air pressure unit 514 of the device. Once activated, the high-pressure air is directed to flow directly for disbursal from the plurality of dispensing nozzles 518, or to be directed to the drying agent unit 516 first, and then through at least one supply line and finally leading to disbursal through the plurality of dispensing nozzles 518.

In alternative embodiments, the air pressure unit 514 and dispensing nozzles 518 may be interceded by a heating element 520. The heating element 520 may be any one of a metallic or polymer PTC heating element, wherein electric current is generated by signal from the ECU 508 or MCU 512, and passed through a resistance to create heat. The high-pressurized air from the air pressure unit 514 may direct the flow of air through the temperature element 520 for heating of the air, and then this high-pressure and heated air may then be directed to the plurality of dispensing nozzles 518. The temperature element 520 may be comprised of any one of an element, such as wire, coil, ribbon, and the material may be any one of a material, including: Kanthal (FeCrAl) wires, Nichrome 80/20 wire and strip, and, or Cupronickel (CuNi).

Figure 6:
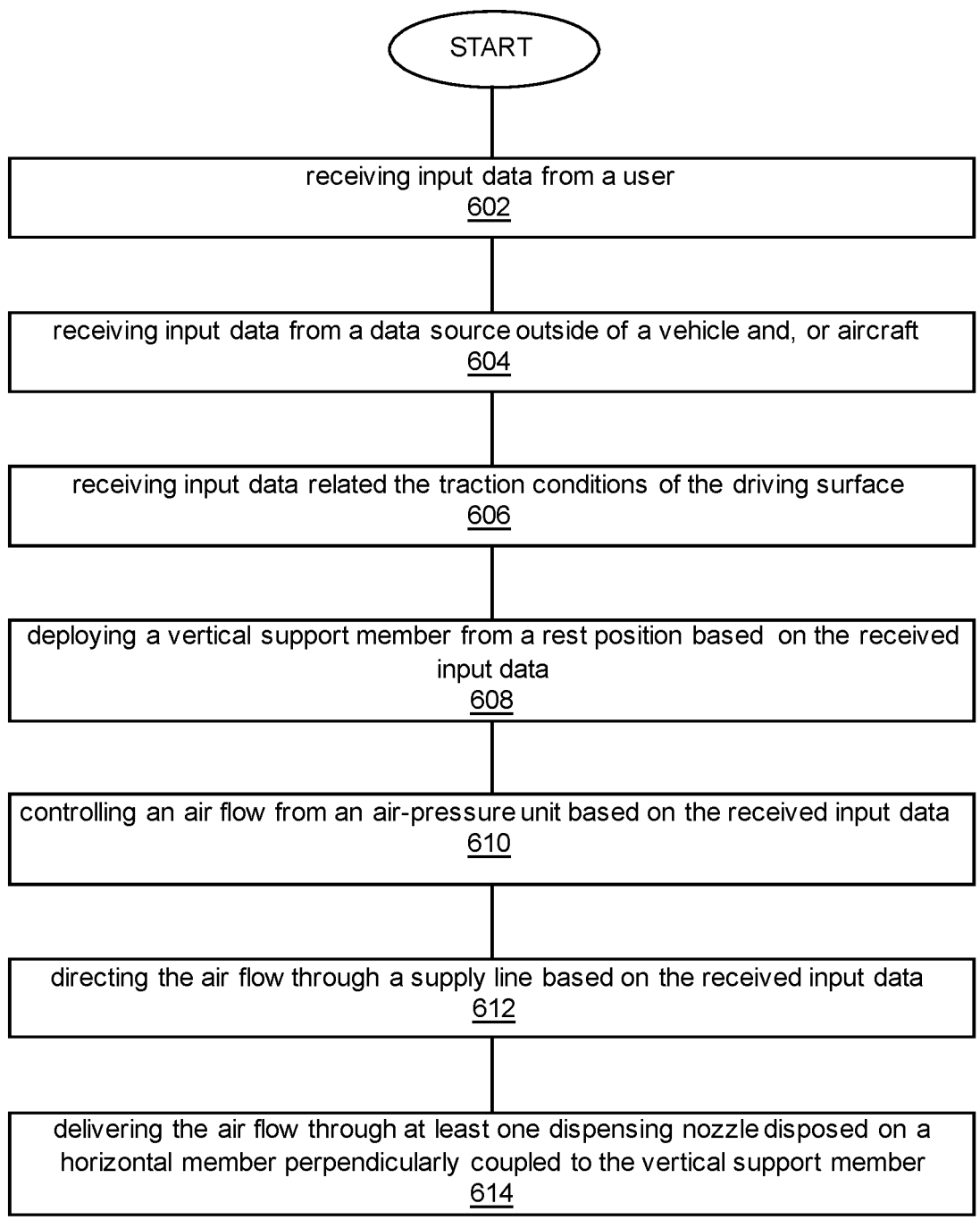
FIG. 6 shows a method flow chart according to aspects of the invention.

FIG. 6 illustrates a flowchart describing a method of delivering automated high-pressure air burst for improved traction, according to an exemplary embodiment of the present invention. A method of delivery is described as follows, however, it is recognized that many other different methods or variations of the described method could also be used.

As shown in FIG. 6, the method comprises the steps of: (1) receiving input data input from a user 602; (2) receiving input data from a data source outside of a vehicle and, or aircraft 604; (3) receiving input data related the traction conditions of the driving surface 606; (4) deploying a vertical support member from a rest position based on the received input data 608; (5) controlling an air flow from an air-pressure unit based on the received input data 610; (6) directing the air flow through a supply line based on the received input data 612; and (7) delivering the air flow through at least one dispensing nozzle disposed on a horizontal member perpendicularly coupled to the vertical support member 614.

Therefore, the foregoing is considered as illustrative and descriptive of a number of embodiments covering the novel aspects of the head and neck device, and it is not intended to be limited to the details shown, since various modifications and structural changes may be made without departing in any way from the spirit of the present invention.

While this specification contains many specific execution details, these should not be interpreted as limitations on the scope of any inventions or of what may be claimed, but rather as descriptions of features specific to particular embodiments of particular inventions. Certain features that are described in this specification in the context of separate embodiments can also be implemented in combination in a single embodiment. Contrariwise, various features that are described in the context of a single embodiment can also be implemented and interpreted in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An apparatus comprising:
a vertical support member pivotally mounted to any one of a wheel axle, chassis, or landing gear at a first terminal end and coupled perpendicularly to a horizontal member to an opposing terminal end;
said horizontal member dimensioned with a first plurality of linear dispensing nozzles oriented towards a bottom portion of at least one wheel, and a second plurality of linear dispensing nozzles oriented towards a top portion of a driving surface, wherein the first and second plurality of linear dispensing nozzles are each fed by an air or fluid line that diverges from a single air or fluid line in operable communication with an on-board air-pressure unit;
said vertical support member and horizontal member configured to extend into a down-right position electro-mechanically at the first terminal end, wherein the first plurality and second plurality of linear dispensing nozzles is positioned less than 24 inches from the bottom portion of at least one wheel and the top portion of the driving surface, wherein activation of the vertical support member and horizontal member extending into the down-right position and deployment of pressurized air or fluid from the first and second plurality of linear dispensing nozzles;
a processor;
a memory element coupled to the processor; and
encoded instructions;
wherein the device is further configured to:
receive input data;
based on the received input data, control an actuator at the first terminal end of the vertical support member to extend the member into a down-right position;
based on the received input data, activate the air pressure unit to control air and, or liquid flow through the single and, or diverged air or fluid lines; and
based on the received input data, deliver a drying agent to the bottom portion of the wheel and the top portion of the driving surface from the first plurality of linear dispensing nozzles and the second plurality of linear dispensing nozzles.

2. The apparatus of claim 1, wherein the input data is activation of a vehicle or aircraft anti-lock braking system and, or vertical stabilizing system for extension and deployment.

3. The apparatus of claim 1, wherein the input data is a sensed wet and, or icy condition.

4. The apparatus of claim 1, wherein the input data is received contextual data from a data source outside of a vehicle or aircraft.

5. The apparatus of claim 1, wherein the input data is a manual input by a user of a vehicle or aircraft.

6. The apparatus of claim 1, wherein deployment of the vertical support member from an up-right position into an operational down-right position is achieved by a release of a tensionable spring coil coupling the vertical support member with any one of the wheel axle, chassis, and, or landing gear.

7. The apparatus of claim 1, wherein deployment of the vertical support member from an up-right position into an operational down-right position is achieved by an electro-mechanical actuator housed at a coupling point of the terminal end of the vertical support member with any one of the wheel axle, chassis, and, or landing gear.

8. The apparatus of claim 7, wherein the housing comprises at least one actuator for causing pivot of any one of, or combination of, the housing and, or vertical support member in at least one axial and, or circular motion.

9. The apparatus of claim 1, further comprising a housing at a coupling point of the vertical support member and horizontal member, wherein the housing comprises at least one actuator for causing pivot of any one of, or combination of, the housing and, or horizontal member in at least one axial and, or circular motion.

10. The apparatus of claim 1, wherein the supply line in operable communication with the air pressure unit and each of the plurality of linear dispensing nozzles is disposed with any one of a agent, such as an abrasive, calcium chloride, calcium sulfate, magnesium sulfate, and, or any anhydrous agent that forms a hydrate.

11. The apparatus of claim 1, wherein the supply line is in operable communication with the air pressure unit and an agent unit, wherein the agent unit houses any one of an agent, such as an abrasive, calcium chloride, calcium sulfate, magnesium sulfate, and, or any anhydrous agent that forms a hydrate.

12. The apparatus of claim 1, wherein the supply line is in operable communication with any one of, or combination of, the air-pressure unit, the plurality of linear dispensing nozzles, a desiccant unit, and, or a heating element.

13. The apparatus of claim 1, wherein the plurality of linear dispensing nozzles further comprises at least one actuator for causing uniform and, or individual pivot of at least one dispensing nozzle in at least one axial and, or circular motion.

14. The apparatus of claim 1, wherein each individual dispensing nozzle is angled such that output of pressurized air and, or agent is directed at an angle, whereby the output of pressurized air and, or agent rebounded from a wheel and, or driving surface is directed toward an undercarriage of the vehicle and, or aircraft.

15. The apparatus of claim 1, comprising an air bursting effect unit housed within the air-pressure unit or outside of the air-pressure unit, wherein the air bursting effect unit creates intermittent air displacement and said air displacement is directed through the at least one supply line for output through at least one dispensing nozzle.

16. The apparatus of claim 15, wherein the air bursting effect unit creates the intermittent air displacement by actuating a valve into at least one other position at any one of an output of the air-pressure unit, at any point of the supply line, input of the plurality of dispensing nozzles, and, or output of at least one dispensing nozzle.

17. The apparatus of claim 1, wherein the horizontal member may further be disposed with a at least one wheel and, or ground clearance guard to create separation between any one of a top portion of a driving surface, vehicle wheel, and, or aircraft landing gear wheel.

18. A system comprising:
a processor;
a memory element coupled to the processor;
encoded instructions;
at least one sensing means configured for detecting data related to traction conditions of a driving surface;
wherein the system is further configured to:
receive input data input from a user;
receive input data from a data source outside of a vehicle and, or aircraft;
receive input data related the traction conditions of the driving surface;
based on the received input data, deploy a vertical support member from a rest position;
based on the received input data, control an air flow from an air-pressure unit; and
based on the received input data, direct the air flow through a supply line and deliver the air flow through at least one dispensing nozzle disposed on a horizontal member perpendicularly coupled to the vertical support member.

19. The system of claim 18, comprising a communication protocol, wherein a CPU signals instructions to an on-board micro controller, said instructions configuring the micro controller for sequential or simultaneous actuation of control output of any of the air-pressure unit, vertical support member, supply line, horizontal member, plurality of linear dispensing nozzles, and, or at least one dispensing nozzle.

20. The system of claim 18, wherein the sensing means configured for detecting data related to traction conditions of a driving surface is disposed on any one of a housing unit, vertical support member, horizontal member, coupling points, mounting points, wheel axis, chassis, landing gear, vehicle, aircraft, and, or vehicle or aircraft pre-fitted wet or icy condition sensor.

21. A method comprising the steps of:
receiving input data input from a user;
receiving input data from a data source outside of a vehicle and, or aircraft;
receiving input data related the traction conditions of the driving surface;
deploying a vertical support member from a rest position based on the received input data;
controlling an air flow from an air-pressure unit based on the received input data;
directing the air flow through a supply line based on the received input data; and
delivering the air flow through at least one dispensing nozzle disposed on a horizontal member perpendicularly coupled to the vertical support member.

* * * * *